(12) United States Patent
Puide et al.

(10) Patent No.: US 8,951,463 B2
(45) Date of Patent: Feb. 10, 2015

(54) METHOD FOR MAKING CEMENTED CARBIDE PRODUCTS

(75) Inventors: Mattias Puide, Vasteras (SE); Per Jonsson, Fors (SE)

(73) Assignee: Seco Tools AB, Fagersta (SE)

( * ) Notice: Subject to any disclaimer, the term of this patent is extended or adjusted under 35 U.S.C. 154(b) by 822 days.

(21) Appl. No.: 13/140,642

(22) PCT Filed: Dec. 17, 2009

(86) PCT No.: PCT/SE2009/051441
§ 371 (c)(1),
(2), (4) Date: Aug. 25, 2011

(87) PCT Pub. No.: WO2010/071580
PCT Pub. Date: Jun. 24, 2010

(65) Prior Publication Data
US 2012/0025411 A1 Feb. 2, 2012

(30) Foreign Application Priority Data

Dec. 18, 2008 (SE) ...................................... 0802601

(51) Int. Cl.
| | | |
|---|---|---|
| *C04B 35/56* | (2006.01) | |
| *C22C 29/08* | (2006.01) | |
| *B22F 1/00* | (2006.01) | |
| *B22F 3/22* | (2006.01) | |
| *C08K 3/00* | (2006.01) | |
| *C08K 3/10* | (2006.01) | |

(52) U.S. Cl.
CPC ................ *C22C 29/08* (2013.01); *B22F 1/0059* (2013.01); *B22F 3/225* (2013.01); *C08K 3/00* (2013.01); *B22F 2001/0066* (2013.01); *C08K 3/10* (2013.01)
USPC .......................................... 264/625; 264/645

(58) Field of Classification Search
CPC .................. C04B 35/5626; C04B 2235/3847; C04B 41/478
See application file for complete search history.

(56) References Cited

U.S. PATENT DOCUMENTS

| | | | | |
|---|---|---|---|---|
| 4,886,638 | A | * | 12/1989 | Penkunas et al. ................ 419/15 |
| 4,902,471 | A | * | 2/1990 | Penkunas et al. ................ 419/33 |
| 5,045,277 | A | | 9/1991 | Penkunas et al. |
| 5,403,374 | A | | 4/1995 | Kitagawa et al. |
| 5,482,670 | A | * | 1/1996 | Hong ................................ 419/15 |
| 5,809,848 | A | | 9/1998 | Viswanadham et al. |
| 5,922,978 | A | * | 7/1999 | Carroll ............................ 75/240 |
| 6,626,975 | B1 | * | 9/2003 | Gries et al. ...................... 75/228 |
| 6,733,562 | B2 | * | 5/2004 | Knuz et al. ...................... 75/351 |
| 6,843,824 | B2 | * | 1/2005 | Anderson ........................ 75/240 |
| 7,309,373 | B2 | * | 12/2007 | Anderson ........................ 75/626 |
| 7,998,381 | B2 | * | 8/2011 | Federzoni et al. ............. 264/117 |
| 2002/0178862 | A1 | * | 12/2002 | Smith et al. ..................... 75/236 |
| 2003/0084752 | A1 | * | 5/2003 | Anderson ........................ 75/240 |
| 2007/0235908 | A1 | * | 10/2007 | Anderson ...................... 264/669 |
| 2009/0113810 | A1 | * | 5/2009 | Laarz et al. ..................... 51/309 |
| 2009/0115092 | A1 | * | 5/2009 | Federzoni et al. ......... 264/176.1 |
| 2011/0030440 | A1 | * | 2/2011 | Keane et al. .................... 72/274 |
| 2011/0248422 | A1 | * | 10/2011 | Lundell et al. ................. 264/128 |
| 2011/0301284 | A1 | * | 12/2011 | Jonsson et al. ................. 524/570 |
| 2013/0064708 | A1 | * | 3/2013 | Lundell et al. .................. 419/65 |
| 2013/0200556 | A1 | * | 8/2013 | Jonsson ........................ 264/645 |

FOREIGN PATENT DOCUMENTS

| | | |
|---|---|---|
| EP | 0443048 A1 | 8/1991 |
| WO | 9728918 | 8/1997 |
| WO | 9818973 A1 | 5/1998 |
| WO | 2008003877 | 1/2008 |
| WO | 2008034903 | 3/2008 |

OTHER PUBLICATIONS

International Search Report dated Apr. 9, 2010, corresponding to the PCT Application.
Supplementary European Search Report, dated Oct. 13, 2014, from corresponding EP application.

* cited by examiner

*Primary Examiner* — Joseph S Del Sole
*Assistant Examiner* — Russell Kemmerle, III
(74) *Attorney, Agent, or Firm* — Young & Thompson

(57) ABSTRACT

A method for the production of tungsten carbide based cemented carbide or cermet tools or components using the powder injection molding method includes mixing of hard constituent powder and a metallic binder powder with an organic binder system, consisting of 30-60 wt-% olefinic polymers and 40-70 wt-% nonpolar waxes, acting as a carrier for the powder. A metallic binder powder that is granulated with a nonpolar wax is used.

8 Claims, No Drawings

METHOD FOR MAKING CEMENTED CARBIDE PRODUCTS

The present invention relates to a method for the production of tungsten carbide based hard metal tools or components using the powder injection moulding method.

Hard metals based on tungsten carbide are composites consisting of small (µm-scale) grains of at least one hard phase in a binder phase. These materials always contain the hard phase tungsten carbide (WC). In addition, other metal carbides with the general composition (Ti, Nb, Ta, W)C may also be included, as well as metal carbonitrides, e.g., Ti(C, N). The binder phase usually consists of cobalt (Co). Other binder phase compositions may also be used, e.g., combinations of Co, Ni, and Fe, or Ni and Fe.

The handling of the fine metal powders used for the production of cemented carbide and cermets are problematic in two ways. Since fine grained powders have large specific surface areas, they are sensitive to reaction with the oxygen in the air. The metal powder oxidation is an exothermal reaction. Also, the oxidation rate increases with the temperature. This means that the oxidation of fine metal powders is an autoaccelerating process. Due to this, self igniting and dust explosions of the metal powders are a serious risk. Further, it has been reported that the inhalation of most of these metal powders is a serious health risk.

These problems are usually solved with a granulation of these powders with an organic binder. The granulating agent adheres to the surface of the powders and also binds many particles together to a free flowing granulated powder. Since the binder adheres to the metal surfaces, it slows down the oxidation rate of the metal surfaces, and decreases the risk of self ignition and dust explosions. Since the granulating agent binds many particles together, it reduces the risk of air borne dust to be inhaled.

In the production of cemented carbide, metal powders granulated with PEG are usually used, when the slurry processing is performed in a water-ethanol mixture.

Industrial production of tungsten carbide based hard metals often includes blending of given proportions of powders of raw materials and additives in the wet state using a milling liquid. This liquid is often an alcohol, e.g., ethanol or water or a mixture thereof. The mixture is then milled into homogeneous slurry. The wet milling operation is made with the purpose of deagglomeration and mixing the raw materials intimately. Individual raw material grains are also disintegrated to some extent. The obtained slurry is then dried and granulated, e.g. by means of a spray dryer. The granulate thus obtained may then be used in uniaxial pressing of green bodies or for extrusion or injection moulding.

Injection moulding is common in the plastics industry, where material containing thermoplastics or thermosetting polymers are heated and forced into a mould with the desired shape. The method is often referred to as Powder Injection Moulding (PIM) when used in powder technology. The method is preferably used for parts with complex geometry.

In powder injection moulding of tungsten carbide based hard metal parts, four consecutive steps are applied:

1. Mixing of the granulated cemented carbide powder with a binder system. The binder system acts as a carrier for the powder and constitutes 25-60 volume % of the resulting material, often referred to as the feedstock. The exact concentration is dependent on the desired process properties during moulding. The mixing is made with all organic constituents in molten state. The resulting feedstock is obtained as pellets of approximate size 4×4 mm.

2. Injection moulding is performed using the mixed feedstock. The material is heated to 100-240° C. and then forced into a cavity with the desired shape. The thus obtained part is cooled and then removed from the cavity.

3. Removing the binder from the obtained part. The removal can be obtained by extraction of the parts in a suitable solvent and/or by heating in a furnace with a suitable atmosphere. This step is often referred to as the debinding step.

4. Sintering of the parts. Common sintering procedures for cemented carbides are applied.

The solids loading, $\phi$, of the feedstock is the volumetric amount of hard constituents, compared to the organic constituents. $\phi$ can be calculated using the following equation:

$$\phi = \frac{\rho_f - \rho_v}{\rho_s - \rho_v}$$

where $\rho_s$ is the density of the cemented carbide as sintered, $\rho_v$ is the mean density of the organic constituents and $\rho_f$ is the density of the feedstock, measured with the helium pycnometer.

The viscosity of the feedstock is affected by the viscosity of the organic binder. The organic binder viscosity is close related to the green strength of the material. A low green strength can cause the parts to crack during extraction, where the expansion of the wax during melting causes stresses in the part. Another drawback with a low green strength is that the parts may be damaged during the handling of the parts. A high green strength of the material means a high viscosity of the organic binder.

In the case of having a high viscosity, problems with mould filling, extended mould wear, weld lines, which may open during sintering, forming cracks and surface defects as well as mould release problems may occur.

It is an object of the present invention to provide a material with a lower viscosity of the feedstock without sacrificing the green strength.

It has now surprisingly been found that by using metallic binder raw material granulated with a wax, the feedstock shows a significantly lower viscosity during injection moulding without sacrificing the green strength.

The method according to the present invention comprises the following steps:

1) Wet milling of the raw materials, i.e. the hard constituents and metallic binder powder, granulated with a nonpolar wax, preferably paraffin wax, in water or alcohol or a combination thereof, preferably 80 wt-% ethanol and 20 wt-% water, together with 0.1-1.2 wt-%, preferably 0.25-0.55 wt-% carboxylic acid, preferably stearic acid as a granulating agent for the subsequent drying. More carboxylic acid is required the smaller the grain size of the hard constituents.

2) Drying of the slurry formed during the above mentioned wet milling process step.

3) Mixing the dried powder by kneading with a binder system, consisting of 30-60 wt-% olefinic polymers and 40-70 wt-% nonpolar waxes. The mixing is performed in a batch mixer or twin screw extruder, heated to 50-200° C. that forms pellets with a size of approximately 4×4 mm.

4) Injection moulding of the feedstock in a conventional injection moulding machine. The material is heated to 100-240° C., preferably 120-140° C., and then forced into a cavity with the desired shape. The obtained part is cooled and then removed from the cavity.

5) Debinding the obtained part. The debinding is performed in two steps.

5a) By extraction of the wax in a nonpolar solvent, at 31-70° C., preferably at 31-55° C. It is within the purview of the skilled artisan to determine by experiments the conditions necessary to avoid the formation of cracks and other defects according to this specification.
5b) By heating in a furnace, preferably in a flowing gaseous medium atmosphere at 2 mbar to atmospheric pressure up to 450° C. It is within the purview of the skilled artisan to determine by experiments the conditions necessary to avoid the formation of cracks and other defects according to this specification.
6) Presintering of the part in the debinding furnace in vacuum at 900-1250° C., preferably at about 1200° C.
7) Sintering of the parts using conventional sintering technique.

The invention can be used for all compositions of cemented carbide and all WC grain sizes commonly used as well as for titanium carbonitride based materials.

EXAMPLE 1

Comparative

A WC-13 wt-% Co submicron cemented carbide powder was made by wet milling 780 g PEG-granulated Co-powder (OMG extra fine, granulated with 2% PEG), 38.66 g Cr3C2 (H C Starck), 5161 g WC (H C Starck DS80), 20.44 g W metal powder, 16 g Fisher-Tropsch wax (Sasol H1) and 22 g stearic acid in 1.6 l milling liquid consisting of ethanol and water (80:20 by weight) for 40 h. The stearic acid is added in this stage of the process to work as a granule forming agent, when spray drying the slurry. The resulting slurry was spray dried to a granulated powder.

EXAMPLE 2

Invention

A WC-13 wt-% Co submicron cemented carbide powder was made by wet milling 780 g wax-granulated Co-powder (OMG extra fine, granulated with 1.5% paraffin wax), 38.66 g Cr3C2 (H C Starck), 5161 g WC (H C Starck DS80), 20.44 g W metal powder, 16 g Fisher-Tropsch wax (Sasol H1) and 22 g stearic acid in 1.6 l milling liquid consisting of ethanol and water (80:20 by weight) for 40 h. The stearic acid is added in this stage of the process to work as a granule forming agent, when spray drying the slurry. The resulting slurry was spray dried to a granulated powder.

EXAMPLE 3

Comparative

The powder made in Example 1 was mixed by kneading 2500 g powder from Example 1 with 50.97 g poly(ethylene-co-(alpha-octene)) with a Mooney viscosity of 16 ml at 121° C. according to ASTM D-1646 (Engage 8440, Dow Plastics) and 45.87 g Paraffin wax (Sasol Wax) and 5.06 g petroleum jelly (Merkur VARA AB) in a Z-blade kneader mixer (Werner & Pfleiderer LUK 1.0). This resulted in a feedstock with a density of 8.23 g/ml, corresponding to a $\phi$ of 0.553.

EXAMPLE 4

Comparative

The powder made in Example 1 was mixed by kneading 2500 g powder from Example 1 with 50.97 g poly(ethylene-co-(alpha-octene)) with a Mooney viscosity of 10 ml at 121° C. according to ASTM D-1646 (Engage 8445, Dow Plastics) and 45.87 g Paraffin wax (Sasol Wax) and 5.06 g petroleum jelly (Merkur VARA AB) in a Z-blade kneader mixer (Werner & Pfleiderer LUK 1.0). This resulted in a feedstock with a density of 8.23 g/ml, corresponding to a $\phi$ of 0.553.

EXAMPLE 5

Invention

The powder made in Example 2 was mixed by kneading 2500 g powder from Example 1 with 51.87 g poly(ethylene-co-(alpha-octene)) with a Mooney viscosity of 16 ml at 121° C. according to ASTM D-1646 (Engage 8440, Dow Plastics) and 46.60 g Paraffin wax (Sasol Wax) and 5.14 g petroleum jelly (Merkur VARA AB) in a Z-blade kneader mixer (Werner & Pfleiderer LUK 1.0). This resulted in a feedstock with a density of 8.23 g/ml, corresponding to a $\phi$ of 0.553.

EXAMPLE 6

Comparative

The feedstock made in example 3 was fed into an injection moulding machine (Battenfeld HM 60/130/22). The machine was used for the injection moulding of a Seco Tools Minimaster 10 mm endmill green body. The injection pressure was 39.8 MPa at an injection speed of 15 ml/s. The green bodies had enough green strength for handling without being damaged.

EXAMPLE 7

Comparative

The feedstock made in example 4 was fed into an injection moulding machine (Battenfeld HM 60/130/22). The machine was used for the injection moulding of a Seco Tools Minimaster 10 mm endmill green body. The injection pressure was 35.1 MPa at an injection speed of 15 ml/s. The green bodies had to be handled with care not to be damaged.

EXAMPLE 8

Invention

The feedstock made in example 5 was fed into an injection moulding machine (Battenfeld HM 60/130/22). The machine was used for the injection moulding of a Seco Tools Minimaster 10 mm endmill green body. The injection pressure was 34.8 MPa at an injection speed of 15 ml/s. The green bodies had enough green strength for handling without being damaged.

EXAMPLE 9

The parts from example 6, example 7 and example 8 were debound by extraction in carbon dioxide at supercritical physical conditions, i.e. at 35 MPa and 58° C. for 20 hours. After the extraction the parts were inspected. The parts from example 6 and 8 showed no surface cracks or other defects. The parts from example 7 showed small cracks visible with an optical microscope at 50× magnification.

The invention claimed is:
1. A method for the production of tungsten carbide based cemented carbide or cermet tools or components using pow- der injection moulding method comprising mixing of (i) hard constituent powder and a metallic binder and (ii) an organic binder system, said organic binder system consisting of 30-60 wt-% olefinic polymers and 40-70 wt-% nonpolar waxes, said organic binder system acting as a carrier for the powders, wherein said metallic binder powder is granulated with a nonpolar wax.

2. The method according to claim 1,
wherein said nonpolar wax granulated with said metallic binder powder is a paraffin wax.

3. The method according to claim 1, wherein said mixing comprises mixing in a batch mixer or twin screw extruder to 50-200° C.

4. The method according to claim 1, further comprising:
wet milling hard constituents and metallic binder powder granulated with a nonpolar wax in a solvent to form a slurry, said solvent being selected from the group consisting of water, alcohol or a combination thereof; and
drying said slurry to form a granulated powder comprising said hard constituent powder and said metallic binder powder granulated with a nonpolar wax.

5. The method according to claim 4, wherein the drying of said slurry is performed by spray drying to the granulated powder.

6. A method for the production of tungsten carbide based cemented carbide or cermet tools or components using powder injection moulding method comprising:
mixing and heating a dried granulated powder with an organic binder system, said organic binder system acting as a carrier for said granulated powder; and
forming pellets of the mixed and heated dried granulated powder with said organic binder system,
wherein said granulated powder comprises a hard constituent powder and a metallic binder powder that is granulated with a non-polar wax, and
wherein said organic binder system consists of 30-60 wt-% olefinic polymers and 40-70 wt-% nonpolar waxes.

7. The method according to claim 6, wherein said nonpolar wax granulated with said metallic binder powder is a paraffin wax.

8. The method according to claim 6, further comprising:
wet milling hard constituents and metallic binder powder granulated with a nonpolar wax in a solvent to form a slurry, said solvent being selected from the group consisting of water, alcohol or a combination thereof; and
drying said slurry to form said granulated powder.

* * * * *